United States Patent
Peterson et al.

(10) Patent No.: US 9,853,303 B2
(45) Date of Patent: Dec. 26, 2017

(54) CENTRIFUGAL WATER SEPARATOR FOR A FUEL CELL SYSTEM

(71) Applicant: Ford Global Technologies, LLC, Dearborn, MI (US)

(72) Inventors: Craig Winfield Peterson, West Bloomfield, MI (US); Steven Potvin, Harper Woods, MI (US); William F. Sanderson, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 760 days.

(21) Appl. No.: 13/923,667

(22) Filed: Jun. 21, 2013

(65) Prior Publication Data

US 2014/0377675 A1   Dec. 25, 2014

(51) Int. Cl.
*H01M 8/04* (2016.01)
*H01M 8/04089* (2016.01)
(Continued)

(52) U.S. Cl.
CPC ........ *H01M 8/04097* (2013.01); *B01D 53/26* (2013.01); *H01M 8/04126* (2013.01); *H01M 8/04164* (2013.01); *B01D 45/12* (2013.01); *B01D 53/265* (2013.01); *B01D 2256/16* (2013.01)

(58) Field of Classification Search
CPC ............................ H01M 8/04164; B01D 45/12
See application file for complete search history.

(56) References Cited

U.S. PATENT DOCUMENTS 2,222,930 A * 11/1940 Arnold .................. B04C 5/00
                                                    209/721
3,426,513 A    2/1969 Bauer
(Continued)

FOREIGN PATENT DOCUMENTS

CA          2339587 A1    11/2001
DE    WO 2012041665 A1 *  4/2012 ............. B01D 45/08
(Continued)

OTHER PUBLICATIONS

Aspinwall, "Design of an Improved Moisture Separator in a Turbocharger System for Fuel Cells", Georgia Institute of Technology, Jul. 2004, 117 pages.

*Primary Examiner* — Stephan Essex
(74) *Attorney, Agent, or Firm* — Brooks Kushman P.C.; Damian Porcari

(57) ABSTRACT

A fuel cell system includes a fuel cell stack in fluid communication with a separator. The separator has a first portion and a second portion forming a chamber. The first portion has a continuous inner wall and an end wall, with an inlet conduit connected to the inner wall and a liquid drain connected to the end wall. The second portion has an end wall and an outlet conduit extending into the chamber to form a channel with the inner wall of the first portion. A fuel cell separator includes a first end and a second end connected by a side wall to define a separation chamber. An inlet conduit is tangentially connected to the wall. An outlet conduit is connected to the first end and extending into the chamber to form a channel with the wall. A liquid drain is connected to the second end.

17 Claims, 3 Drawing Sheets

(51) Int. Cl.
  *H01M 8/04119* (2016.01)
  *B01D 53/26* (2006.01)
  *B01D 45/12* (2006.01)

(56) References Cited

U.S. PATENT DOCUMENTS

| | | | |
|---|---|---|---|
| 3,898,068 A * | 8/1975 | McNeil | B01D 45/12 |
| | | | 55/337 |
| 4,015,960 A | 4/1977 | Nutter | |
| 5,502,984 A * | 4/1996 | Boehde | B01D 45/12 |
| | | | 210/512.1 |
| 5,643,470 A | 7/1997 | Amini | |
| 6,579,637 B1 | 6/2003 | Savage et al. | |
| 6,776,823 B2 | 8/2004 | Hotta et al. | |
| 6,855,444 B2 | 2/2005 | Morishima et al. | |
| 6,869,469 B2 | 3/2005 | Grover et al. | |
| 6,977,004 B2 | 12/2005 | Sakakibara et al. | |
| 7,250,075 B1 | 7/2007 | Vasquez et al. | |
| 7,534,514 B2 | 5/2009 | Pristash | |
| 7,582,143 B2 | 9/2009 | Berger et al. | |
| 7,618,471 B2 | 11/2009 | Brown et al. | |
| 7,621,982 B2 | 11/2009 | Kang et al. | |
| 8,034,142 B2 | 10/2011 | Sakakida et al. | |
| 8,221,633 B2 | 7/2012 | Lam | |
| 8,236,456 B2 | 8/2012 | Koenekamp et al. | |
| 2001/0005986 A1 * | 7/2001 | Matsubara | B01D 45/12 |
| | | | 55/459.1 |
| 2004/0197622 A1 | 10/2004 | Wheat et al. | |
| 2005/0172583 A1 * | 8/2005 | Wydra | B01D 45/04 |
| | | | 55/337 |
| 2005/0199546 A1 | 9/2005 | Rusta-Sallehy et al. | |
| 2006/0035126 A1 * | 2/2006 | Kurrle | H01M 8/04029 |
| | | | 429/437 |
| 2006/0240299 A1 | 10/2006 | Kanasugi | |
| 2008/0057362 A1 | 3/2008 | Wheat et al. | |
| 2008/0057368 A1 | 3/2008 | McElroy | |
| 2010/0092818 A1 | 4/2010 | Lee et al. | |
| 2010/0209818 A1 * | 8/2010 | Fukuma | F04F 5/20 |
| | | | 429/513 |
| 2011/0053013 A1 * | 3/2011 | Baur | H01M 8/04097 |
| | | | 429/413 |
| 2014/0007770 A1 * | 1/2014 | Gaebler | B01D 45/08 |
| | | | 95/272 |

FOREIGN PATENT DOCUMENTS

| | | |
|---|---|---|
| EP | 2528149 A1 | 11/2012 |
| JP | 2002177720 A | 6/2002 |
| JP | 2006147440 A | 6/2006 |
| WO | 03107456 A1 | 12/2003 |

* cited by examiner

CENTRIFUGAL WATER SEPARATOR FOR A FUEL CELL SYSTEM

TECHNICAL FIELD

Various embodiments relate to a device for removing water from a fuel cell system.

BACKGROUND

During fuel cell operation, byproducts such as product water and nitrogen, and unconsumed hydrogen may form at the anode side of a fuel cell stack. In certain known systems, accumulation of product water and nitrogen accumulation is controlled in an attempt to avoid a reduction in fuel cell performance, and/or fuel cell system shut down. One known approach is to release the water and nitrogen via a passageway downstream of the fuel cell stack. The byproducts may be recirculated such that the unconsumed hydrogen is returned to the anode side of the fuel cell stack. Also, recirculation may be used to humidify the anode side to promote efficient chemical conversion and extend cell membrane life. However, liquid water in the recirculation stream, such as droplets, may need to be removed to prevent water blockages within fuel cell stack flow field channels or an ejector.

Traditional water separators have flow paths, screens and/or meshes that entrain water droplets in flow impact for water removal. These devices may have high water removal efficiencies, e.g., up to 99%. However, the design of these conventional devices causes a relatively large pressure drop across the system for a given volume of the device.

For an ejector based fuel cell system with a passive recirculation loop, minimizing the pressure drop through an anode loop of a fuel cell system may be critical. Ejectors are momentum transfer devices, and as such, the passive recirculation flow they induce is a function of compression work performed by the ejector. Any pressure drops within the anode loop increase the compression work for the ejector, and may limit the recirculation flow. The dominant pressure drop in the anode loop is caused by the fuel cell stack, and pressure drops across other components, such as a water separator, need to be minimized for the ejector and fuel cell to function properly. Additionally, the high efficiency of conventional separators may result in too low of humidity and degrade fuel cell performance and life as some humidity is desirable in the recirculation flow.

SUMMARY

According to an embodiment, a fuel cell system is provided with a fuel cell stack and a separator in fluid communication with the fuel cell stack. The separator includes first and second ends connected by a side wall and forming a separation chamber, an inlet conduit tangentially connected to the wall, an outlet conduit connected to the first end and extending into the chamber to form a channel with the wall, and a liquid drain connected to the second end.

According to another embodiment, a fuel cell separator is provided with a first end and a second end connected by a side wall to define a separation chamber. An inlet conduit is tangentially connected to the wall. An outlet conduit is connected to the first end and extending into the chamber to form a channel with the wall. A liquid drain is connected to the second end.

According to yet another embodiment, a fuel cell system is provided with a fuel cell stack and a separator in fluid communication with the fuel cell stack. The separator has a first portion and a second portion forming a chamber. The first portion has a continuous inner wall and an end wall, with an inlet conduit connected to the inner wall and a liquid drain connected to the end wall. The second portion has an end wall and an outlet conduit extending into the chamber to form a channel with the inner wall of the first portion.

Various embodiments of the present disclosure have associated non-limiting advantages. For example, providing a separator with a low pressure drop allows for use with a passive recirculation loop in an anode side of a fuel cell. The low pressure drop is created within the separator by providing a smooth tangential fluid entry into the separator, and not using additional mesh material in the gas phase fluid flow path within the separator. The separator is designed to remove larger water droplets from the fluid flow, while leaving water vapor and smaller sized water droplets. The separator therefore does not have a high efficiency for overall water removal. This is acceptable for the fuel cell application, as humidity is required on both the anode and cathode sides for the fuel cell to function correctly. The separator must remove a sufficient quantity and droplets of a size that may cause flooding of the anode flow field of the stack. Since the anode stream is mixed with a dry fresh feed of hydrogen prior to stack inlet, there is an opportunity for small droplets to vaporize prior to reaching the stack. Additionally, the stack module can accept a certain amount of liquid water ingestion without loss of cell voltage stability. This amount is typically in the range of 5-30 cc/min. The design of the separator provides a small, compact, easily manufactured device allowing for use in applications such as a fuel cell system in a vehicle where packaging, weight, and cost are on-going concerns. Additionally, the separator structure and assembly is designed to be compatible with hydrogen molecules in a fluid flow, such as downstream of an anode side of a fuel cell stack.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. Description of constituents in chemical terms refers to the constituents at the time of addition to any combination specified in the description, and does not necessarily preclude chemical interactions among constituents of the mixture once mixed.

Figure 1:
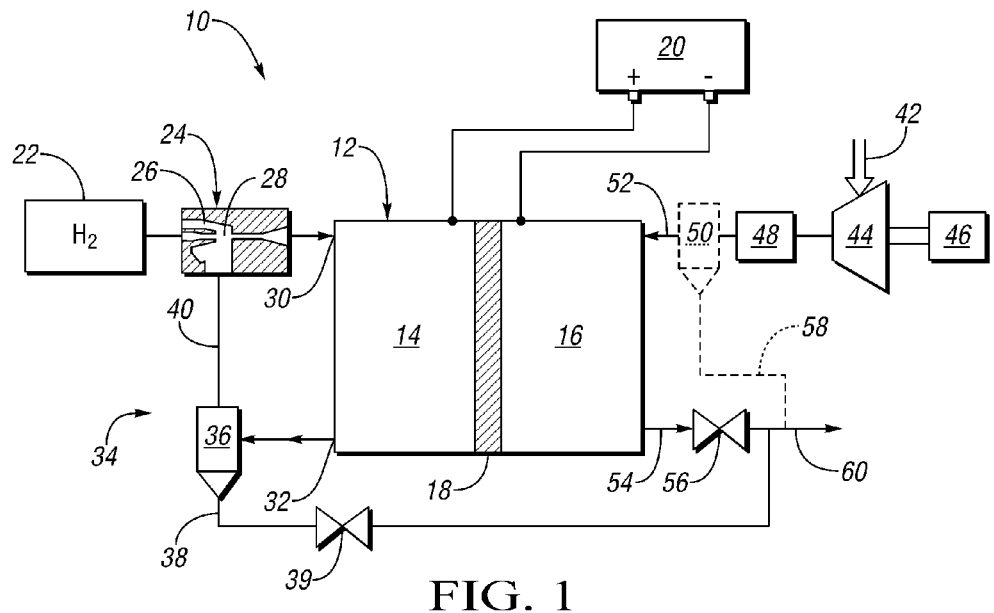
FIG. 1 illustrates a schematic of a fuel cell system according to an embodiment.

FIG. 1 schematically illustrates a fuel cell system 10 as a process flow diagram according to at least one embodiment. For example, fuel cell system 10 may be used in a vehicle to provide electrical power to operate an electric motor to propel the vehicle or perform other vehicle functions. The fuel cell system 10 may be a proton exchange membrane fuel cell (PEMFC) as is known in the art.

The fuel cell system 10 has a fuel cell stack 12. The stack 12 contains an anode side 14, a cathode side 16, and a membrane 18 therebetween. The fuel cell system 10 electrically communicates with and provides energy, for example, to a high voltage bus 20 or a traction battery. The fuel cell stack 12 may also have a cooling loop (not shown).

During operation of the fuel cell system 10, product water, residual fuel such as hydrogen, and byproducts such as nitrogen, may accumulate at the anode side 14 of the fuel cell stack 12. Attempts have been made to remove the liquid product water and byproducts and to reuse the residual hydrogen and water vapor. One approach is to collect those constituents in a separator 36 downstream of the fuel cell stack 12, separate at least a portion of the liquid water and/or nitrogen, and return the remaining constituents to the fuel cell stack 12 via a return passageway in a recirculation loop.

A primary fuel source 22 is connected to the anode side 14 of the fuel cell stack 12, such as a primary hydrogen source. Non-limiting examples of the primary hydrogen source 22 are a high-pressure hydrogen storage tank or a hydride storage device. The hydrogen source 22 is connected to one or more ejectors 24. The ejector 24 has a nozzle 26 supplying hydrogen into the converging section of a converging-diverging nozzle 28. The diverging section of the nozzle 28 is connected to the input 30 of the anode side 14.

The output 32 of the anode side 14 is connected to a passive recirculation loop 34. Typically, an excess of hydrogen gas is provided to the anode side 14 to ensure that there is sufficient hydrogen available to all of the cells in the stack 12. In other words, hydrogen is provided to the fuel cell stack 12 above a stoichiometric ratio of one, i.e. at a fuel rich ratio relative to exact electrochemical needs. The recirculation loop 34 is provided such that excess hydrogen unused by the anode side 14 is returned to the input 30 so may be used and not wasted.

Additionally, accumulated liquid and vapor phase water is an output of the anode side 14. The anode side 14 requires humidification for efficient chemical conversion and to extend membrane life. The recirculation loop 34 may be used to provide water to humidify the hydrogen gas before the input 30 of the anode side 14.

The recirculation loop 34 contains a separator 36, or water knock-out device. The separator 36 receives a stream or fluid mixture of hydrogen gas, nitrogen gas, and water from the output 32 of the anode side 14. The water may be mixed phase and contain both liquid and vapor phase water. The separator 36 removes at least a portion of the liquid phase water, which exits the separator through drain line 38. At least a portion of the nitrogen gas, hydrogen gas, and vapor phase water may also exit the drain line 38, and pass through a control valve 39, for example, during a purge process of the fuel cell stack 12. The remainder of the fluid in the separator 36 exits through passageway 40 in the recirculation loop 34, which is connected to the ejector 24. The fluid in passageway 40 is fed into the converging section of the converging-diverging nozzle 28 where it mixes with incoming hydrogen from the nozzle 26 and hydrogen source 22.

Liquid water may be removed from the anode side 14 by the separator 36 to prevent water blockages within the channels and cells of the anode side 14. Water blockages within the fuel cell stack 12 may lead to decreases in cell voltage and/or voltage instabilities within the fuel cell stack 12. Liquid water may also be removed by the separator 36 to prevent a blockage or partial blockage within the ejector 24. A liquid water droplet in the diverging section of the converging-diverging nozzle 28 would effectively create a second venturi section within the nozzle 28 and lead to pumping instabilities for the ejector 24.

The cathode side 16 of the stack 12 receives oxygen, for example, as a constituent in an air source 42. In one embodiment, a compressor 44 is driven by a motor 46 to pressurize the incoming oxygen. The pressurized air is then humidified by a humidifier 48 before entering the cathode side 16. Another separator 50 (shown in phantom) may be positioned downstream of the humidifier 48. The separator 50 may be used to remove liquid water from the humidified air flow before it enters the cathode side 16 of the stack 12 at input 52. Water droplets may be present downstream of the humidifier 48 due to liquid water being entrained by air high flow rates within the humidifier 48. Liquid water may be removed by the separator 50 to prevent water blockages within the cells of the cathode side 16, leading to decreases in cell voltage and/or instabilities within the fuel cell stack 12. The output 54 of the cathode side 16 is connected to a valve 56. Drain line 38 from separator 36, and a drain line 58 from separator 50 may be connected to a line 60 downstream of the valve 56. In other embodiments, the drain lines may be plumbed to other locations in the fuel cell system 10.

Other system architectures may also be used for the fuel cell system 10. For example, a turbine may be used in addition to the compressor 44 to induce flow through the cathode side 16. In one example, a turbine is positioned downstream of the cathode stack outlet 54, with a separator interposed between the cathode side 16 and the turbine to remove liquid water before the fluid stream enters the turbine.

Based on the use of the ejector 24 to create flow through the anode side 14 and induce flow through the passive recirculation loop 34, the ejector 24 must overcome any pressure drops in the system, which includes a typically significant pressure drop across the fuel cell stack 12. The system 10 as shown does not include a pump or other device to induce flow in the recirculation loop 34, therefore all the compression work must be accomplished by the ejector, otherwise described as a jet pump. To enable this function, the separator 36 needs to have a low pressure drop across it. The separator 36 also needs to remove larger droplets of water from the fluid to prevent water blockages in the recirculating flow in the fuel cell stack 12 or ejector 24 caused by droplets. The separator 36 permits vapor phase water and smaller water droplets to remain in the recirculating flow in passageway 40 and return to the ejector 24 for humidification purposes. In one example, the separator 36 removes water droplets having a diameter on the order of one millimeter or larger.

Additionally, as separator 36 receives fluid flow from the anode side 14, the separator 36 needs to be designed for use with hydrogen gas. Generally, hydrogen gas may cause material degradation or embrittlement issues and material used in the separator 36 need to be hydrogen compatible. Additionally, hydrogen is a small molecule, and many conventional separator devices are not suitable for use with hydrogen because their design may permit leaks, for example, with a conventional threaded connection. Other conventional separators may contain rotating or moving parts, such as a rotating vane, or the like, which may not be compatible with hydrogen as the lubricant may poison the fuel cell stack, or the hydrogen may degrade or decompose the lubricant.

Separator 50 also needs to remove larger droplets of water from the fluid to prevent water blockages caused by droplets in the flow in the cathode side 16 of the fuel cell stack 12. The separator 50 permits vapor phase water, and smaller water droplets to remain in the flow for humidification. In one embodiment, the separator 50 removes water droplets that are the same size or larger than the cathode side 16 flow field channel widths. In one example, the cathode side flow field channels are 0.2-1.0 millimeters.

Figure 2:
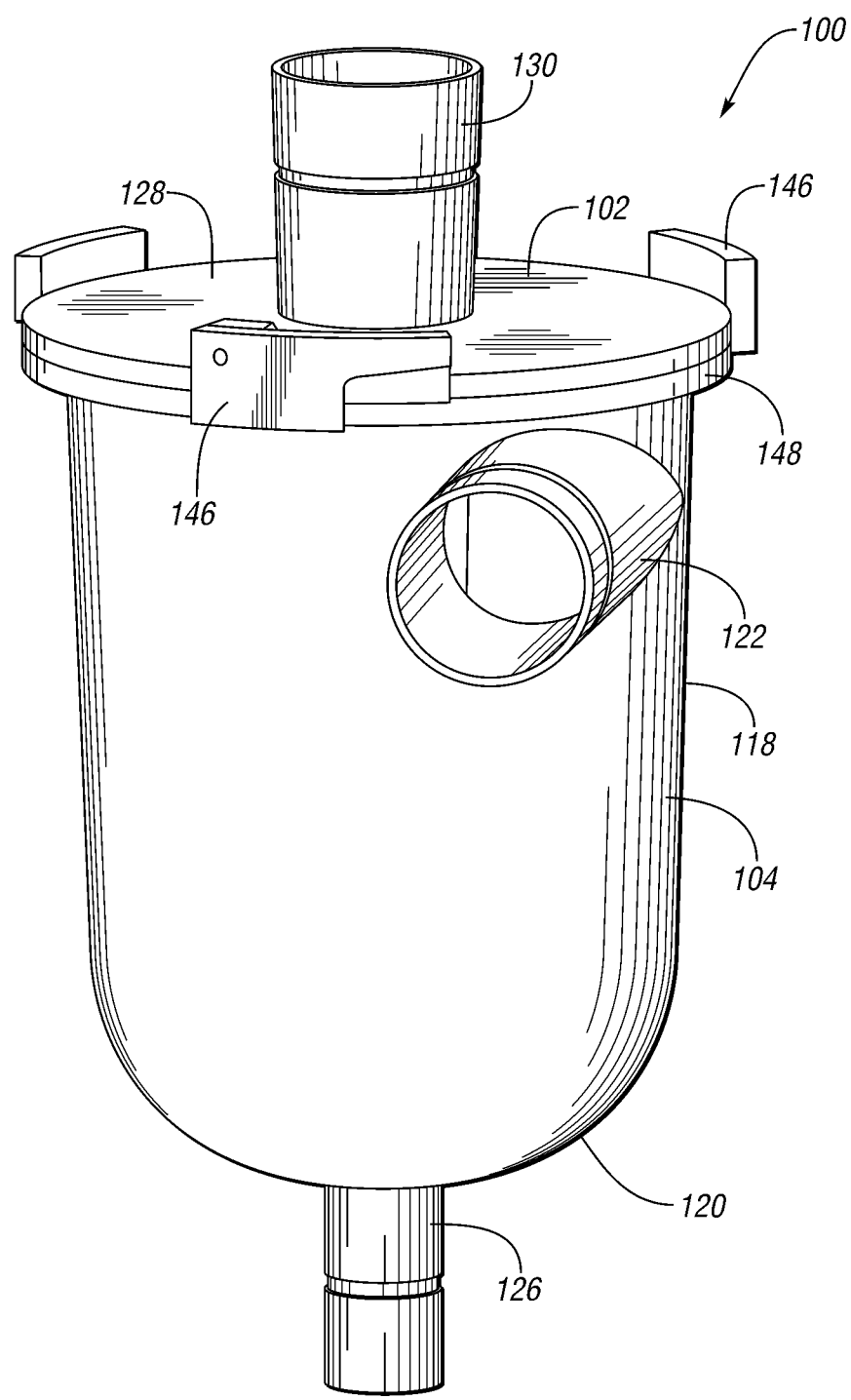
FIG. 2 illustrates a perspective view of a water separator according to an embodiment for use with the fuel cell of FIG. 1.
Figure 3:
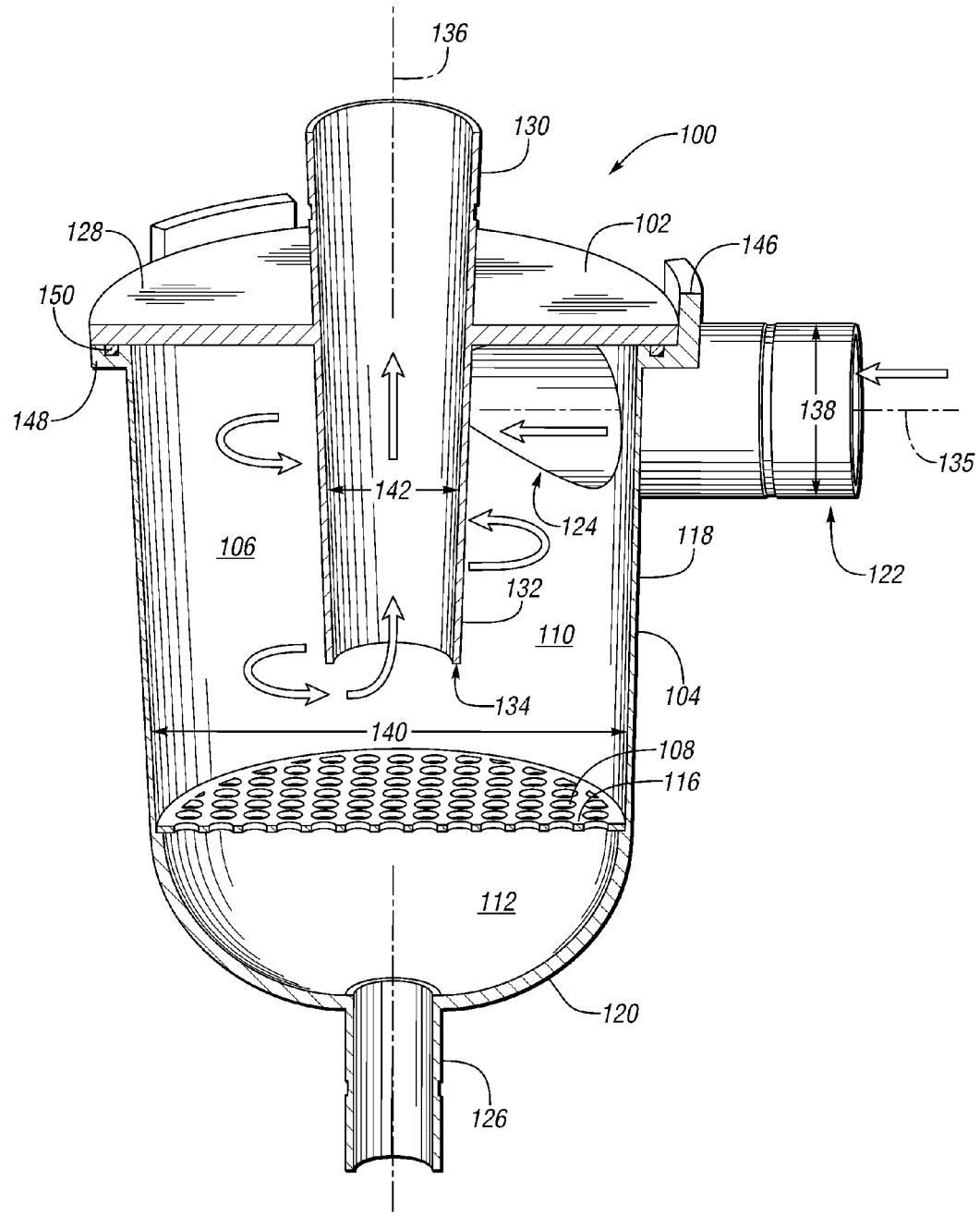
FIG. 3 illustrates a perspective cutaway view of the water separator of FIG. 2.

FIGS. 2 and 3 illustrate an embodiment of a separator 100. The separator 100 may be used as separator 36 or as separator 50 for the fuel cell system 10 illustrated in FIG. 1. Separator 100 has an upper portion 102 and a lower portion 104. The upper and lower portions 102, 104 define an internal separation chamber 106.

A divider 108 divides the chamber 106 into an upper vortex chamber 110 and a lower collection chamber 112. The divider 108 may be a screen 116, and in one embodiment is fastened within the lower portion 104 using spot welding, or another process. The screen 116 may be a larger mesh size and made of a material having a low contact angle to prevent liquid from sheeting on the screen 116, and allow the liquid to drip down into the collection chamber 112. In one embodiment, the contact angle of the screen 116 is less than ninety degrees, and in a further embodiment is less than fifty degrees.

The lower portion 104 has a generally cylindrical side wall 118 and an end wall 120. The side wall 118 and end wall 120 may be integrally formed, as shown. In other embodiments, the side wall 118 may be tapered into a frustoconical shape, conical shape, or another suitable shape. The end wall 120 may be concave or bowl shaped. In an alternative embodiment, the end wall 120 is planar.

The collection chamber 112 may be sized to only collect a small amount of liquid water. The collection chamber 112 of the lower portion 104 may be reduced in volume up to just before the point where circulating fluid in the vortex chamber 110 causes splashing of liquid from the collection chamber 112 to the vortex chamber 110 through the screen 116.

The lower portion 104 has an inlet conduit 122. The inlet conduit 122 is tangentially connected to the side wall 118 such that fluid flowing through the inlet conduit 122 enters the chamber 106 to flow smoothly along the side wall 118 without any turns imposed by the geometry of the connection between the inlet conduit 122 and the lower portion 104. At the entrance point 124 where the fluid enters the chamber 110 from the inlet conduit 122, the fluid is flowing generally parallel with the side wall 118.

The lower portion 104 also has a drain conduit 126. The drain conduit 126 is positioned at the lowest point of the end wall 120, and is typically positioned in the center or a central region of the end wall 120, or along the longitudinal axis 136 of the separator 100. By positioning the drain 126 at the lowest point of the chamber 112, any liquid within the chamber 112 may be easily removed, for example, if the vehicle or fuel cell is in a low ambient temperature environment where freezing is possible.

The drain conduit 126 may be sized such that liquid water cannot bridge or sheet across the opening. The drain conduit 126 may also be made from a low contact angle material to prevent liquid sheeting across the opening.

The upper portion 102 has an end wall 128 that supports the outlet conduit 130. The outlet conduit 130 is connected to the upper portion 102 such that it extends generally perpendicularly from the end wall 128 where it is attached. In other embodiments, the connection angle between the outlet conduit 130 and the end wall 128 may vary. The outlet conduit 130 has a section of tubing 132 that extends into the chamber 106 as shown such that an entrance 134 to the outlet conduit 130 from the chamber 106 is spaced apart from the divider 108.

The tubing 132 of the outlet conduit 130 extends into the chamber 106 from the end wall 128. The tubing 132 is nested with the side wall 118 of the lower portion 104 to form a channel therewith. The tubing 132 has a generally cylindrical shape.

In one embodiment, the inlet conduit 122 is positioned adjacent to an upper edge of the lower portion 104 such that it is adjacent to the upper portion 102 of the separator 100. The inlet conduit 122 is positioned at a higher elevation than the end of the tubing 132 to induce and retain swirl and prevent the fluid flow from shortcutting across the chamber 106. The inlet conduit has a longitudinal axis 135.

The outlet conduit 130 shares a common longitudinal axis 136 with the separator 100, such that the side wall 118 and the outlet conduit 130 are coaxial with one another. The drain conduit 126 is also positioned along the longitudinal axis 136.

In the embodiment shown, axis 135 is perpendicular to axis 136. In other embodiments, the positioning of axis 135 with respect to the separator 100 and axis 136 may be varied, for example, such that flow is introduced into the chamber generally tangentially to the side wall 118 and also with a downward flow component. The axes 135, 136 are spaced apart from one another such that they do not intersect.

For a vehicle or fuel cell application, the inlet and outlet conduits 122, 130 do not need to be positioned along a common axis, or in-line with one another, as is shown for many conventional, prior art separators, thereby allowing for improved packaging of the separator 100 into available space. Overall dimensions of the separator 100 are illustrated in FIG. 2 according to one non-limiting example.

In one example, the ratio of the diameter 138 of the inlet conduit 122 to the diameter 140 of the chamber 106 is one to three. In other embodiments, the ratio of the diameter 138 to the diameter 140 may range between 1:2 and 1:8. The diameter of the chamber 106 is the diameter of the cylindrical side wall 118. The spacing between the divider 108 and the entrance 134 to the outlet conduit 130 is equal to the diameter 142 of the outlet conduit 130. The inlet and outlet conduits 122, 130 may have the equal diameters, or in alternative embodiments, may have different diameters. In one embodiment, the inlet 122 diameter is 25 mm and the outlet 130 diameter is 25 mm.

The first portion 102 and second portion 104 are connected to one another using a clamping mechanism 146 or other fastening device suitable for use with hydrogen as is known in the art. The upper and lower portions 102, 104 have mating surfaces to seal the chamber 106. The end wall 128 of the upper portion 102 may act as the mating surface for the upper portion 102. The lower portion 104 may have a flange 148 extending from the side wall 118 to act as the mating surface for the lower portion 104. One of the upper and lower surfaces may have a groove 150 for an O-ring for use in sealing the chamber 106.

Although the separator 100 is described as having an upper portion and a lower portion, the separator may also be constructed in another manner according to various embodiments of the disclosure. For example, the two portions may be integrally formed and do not need to be separable. The portions may be welded or otherwise joined together.

Operation of the separator 100 is further described with reference to FIGS. 2 and 3. The fluid stream from the anode 14 enters the separator 100 though the inlet conduit 122, and contains hydrogen gas, nitrogen gas, water vapor, and liquid water. The fluid enters the chamber 110 generally parallel or tangential to a side wall 118, which reduces the overall pressure drop across the separator. The side wall 118 of the chamber 110 and the extension 132 act to guide the fluid in the chamber 110 in a channel that forms between them. The fluid is spun in the chamber 110 about the extension 132, as shown by arrows, to remove liquid entrained in the fluid stream. Centripetal acceleration created by the rotational fluid flow causes the liquid droplets to move to the wall 118. The droplets impact the wall 118 and then gravity causes the liquid to run down the wall 118 and into the collection chamber 112. The remaining fluid, which includes hydrogen gas, nitrogen gas, water vapor, and smaller water droplets continue to spin within the separator 100. The smaller water droplets continue to spin or rotate with the fluid flow as their mass is insufficient for the centrifugal forces acting on them to cause them to move to and impact the wall 118.

After entering the chamber 110 from the inlet conduit 122, the fluid turns 90 degrees in order to flow towards the outlet conduit 130. This 90 degree turn may be gradual, with the fluid flow path in a helical pattern or spiral pattern. The entrance 134 to the outlet conduit 130 is spaced apart from and faces generally away from the inlet conduit 122. The entrance 134 is also spaced apart from the wall 118 and located generally in the center of the separator 100. In order to exit the chamber 110 to tubing 132, the fluid turns 180 degrees, which provides for additional separation of entrained water droplets from the fluid stream. The geometry of the separator 100 causes the fluid stream to make the 180 degree turn as well as separate away from the wall, as shown by the arrows in FIG. 3 in order to reach the entrance 134 of the outlet conduit 130. Liquid droplets above a certain size are separated from the fluid flow as they cannot follow this turn due to their momentum, and these droplets make their way to the collection chamber 112. The fluid flow has a generally unobstructed, uninterrupted flow path between the inlet conduit 122 and the outlet conduit 130, which decreases the pressure drop across the separator 100.

Momentum of the liquid droplets and forces caused by centripetal acceleration causes the droplets to continue on a straight path to the outer wall 118 of the separator 100. The gas portion of the fluid stream has a much lower density and is therefore able to turn and flow with the curvature of the chamber 106. The initial turn of the fluid stream after the entrance region 124 causes the first stage of liquid water separation, and the water that impacts the wall 118 flows down the sides 118 and into the collection chamber 112 below. As the fluid starts to move in a circular or helical motion around the vertical axis 136 of the separator 100, it expands into the larger volume in the chamber 110 and the fluid stream velocity decreases. The fluid stream is forced to turn ninety degrees downward toward the entrance 134 of the outlet conduit 130. The fluid stream is then forced by the separator geometry to make a second turn of 180 degrees and accelerate back up to approximately its original speed as it enters the outlet conduit 130, assuming the outlet 130 diameter is approximately the same as the inlet diameter 122. Liquid water droplets in the fluid stream are flung downwards into the separation screen 116 and the collection chamber 112 during the initial portion of the 180 degree turn as their momentum is too large for them to follow the flow streamline and so their flow trajectory causes inertial impaction with the separator 100 and separation from the fluid stream. Only low density gases or very small droplets are able to follow the fluid streamline and make this second tight turn that is also against gravitational forces to flow into the outlet conduit 130. Any liquid water droplets that make this turn are so finely dispersed that they should be able to be vaporized upon mixing in the ejector 24.

The screen 116 of the divider 108 creates a location for condensation to occur and also provides a flow-smoothing effect for fluid rotating in the vortex chamber 110. The screen 116 also acts to maintain a relatively calm environment within the collection chamber 112, and prevent fluid motion such as splashing into the upper chamber 110. The collection chamber 112 beneath the screen 116 collects liquid water and directs it to the drain conduit 126.

During soak of the fuel cell, for example, at fuel cell startup or prior to startup, and during system operation, the separator 100 may be used in order to remove water from the anode loop of the fuel cell. Additionally, excess nitrogen may be removed from the anode side 14 of the fuel cell during a purge process. When the concentration or partial pressure of nitrogen in the anode side 14 of the fuel cell is too high, the performance of the fuel cell 10 decreases as there is an insufficient concentration of hydrogen, or the partial pressure of hydrogen is too low. By purging the anode side 14 of the fuel cell, the excess nitrogen is flushed out of the anode side 14 of the stack 12. The mixture of hydrogen, excess nitrogen, and liquid and vapor phase water enters the separator 100 during the purge process. The separator 100 causes liquid water, excess nitrogen, and a portion of the hydrogen to exit the drain line 126 of the separator. Some hydrogen and other constituents in the flow may be returned through the outlet conduit 130 of the separator to the ejector 24. The ejector 24 also may not perform well in the presence of high concentrations of nitrogen, as the density of nitrogen is higher than that of hydrogen. Therefore, by removing excess nitrogen from the anode side 14 of the fuel cell during a purge process, overall fuel cell performance may be increased.

Figure 4:
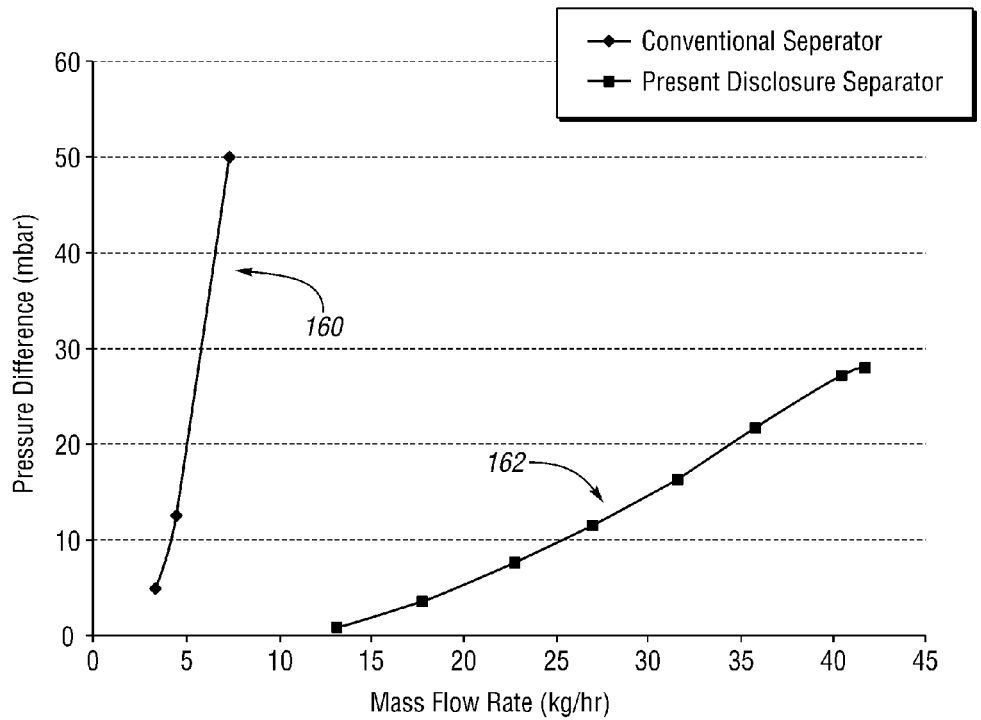
FIG. 4 illustrates a graph comparing pressure drops across a conventional separator and the separator of FIG. 2 at various mass flow rates.

FIG. 4 illustrates a pressure difference, or pressure drop, for an industrial, prior art centrifugal separator and the separator according to FIG. 2 at various mass flow rates. The pressure drop is shown in millibars. The mass flow rate is shown in kilograms per hour. The prior art separator is approximately twice the package size as the separator of FIG. 2. The prior art separator is a conventional type having in-line inlet and outlet conduits and a cylindrical chamber located generally below the conduits. The prior art separator has the fluid flow making sharp turns to both enter and exit the separator. The pressure drop across the prior art separator is shown by line 160. The pressure drop across the separator of FIG. 2 is shown by line 162. As can be seen in FIG. 4, the pressure drop across the separator according to the present disclosure is much lower than the prior art across all flow rates tested. For the fuel cell system 10, a typical continuous mass flow rate in the recirculation loop during normal operation is approximately 20 kg/hr. A typical recirculation loop mass flow rate for a fuel cell system 10 fill operation during a cold start is approximately 45 kg/hr. Of course, these values are only representative of one example of a fuel cell system and are used as a non-limiting example.

Various embodiments of the present disclosure have associated non-limiting advantages. For example, providing a separator with a low pressure drop allows for use with a passive recirculation loop in an anode side of a fuel cell. The low pressure drop is created within the separator by providing a smooth tangential fluid entry into the separator, and not using additional mesh material in the gas phase fluid flow path within the separator. The separator is designed to remove larger water droplets from the fluid flow, while leaving water vapor and smaller sized water droplets. The separator therefore does not have a high efficiency for overall water removal. This is acceptable for the fuel cell application, as humidity is required on both the anode and cathode sides for the fuel cell to function correctly. Since the anode stream is mixed with a dry fresh feed of hydrogen prior to stack inlet, there is an opportunity for small droplets to vaporize prior to reaching the stack. Additionally, the stack module can accept a certain amount of liquid water ingestion without loss of cell voltage stability. This amount is typically in the range of 5-30 cc/min. The design of the separator provides a small, compact, easily manufactured device allowing for use in applications such as a fuel cell system in a vehicle where packaging, weight, and cost are on-going concerns. Additionally, the separator structure and assembly is designed to be compatible with hydrogen molecules in a fluid flow, such as downstream of an anode side.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A fuel cell system comprising:
   a fuel cell stack; and
   a separator in fluid communication with the fuel cell stack, the separator including:
   first and second ends connected by a vertical side wall and forming a separation chamber,
   an outlet conduit provided by a single walled tube connected to the first end and extending into the chamber, an outer side of the tube, the side wall, and the first end defining a channel,
   an inlet conduit tangentially connected to the wall within the channel,
   a liquid drain connected to the second end; and
   a divider extending from the side wall across the separation chamber and positioned between the outlet conduit and the second end;
   wherein the vertical side wall of the separation chamber, the outlet conduit, and the liquid drain are positioned along a longitudinal axis of the separator to be coaxial with one another;
   wherein the chamber of the separator is unobstructed between the divider and an entrance to the outlet conduit; and
   wherein the entrance and an inside of the outlet conduit is unobstructed for flow therethrough.

2. The fuel cell system of claim 1 wherein the fuel cell stack has an anode side and a cathode side;
   the fuel cell system further comprising a recirculation loop in fluid communication with the anode side;
   wherein the recirculation loop includes the separator, the separator downstream of the anode side.

3. The fuel cell system of claim 2 further comprising an ejector in fluid communication with the anode side and upstream of the anode side.

4. The fuel cell system of claim 3 wherein the ejector is in fluid communication with the recirculation loop, wherein the ejector is downstream of the separator, and wherein the ejector induces all flow through the recirculation loop such that the recirculation loop is passive.

5. The fuel cell system of claim 1 wherein the fuel cell stack has an anode side and a cathode side;
   the fuel cell system further comprising a humidifier in fluid communication with the cathode side and upstream of the cathode side;
   wherein the separator is interposed between the humidifier and the cathode side.

6. The fuel cell system of claim 1 wherein the entrance to the outlet conduit is spaced apart from the divider within the chamber by approximately a diameter of the outlet conduit, the chamber being unobstructed between the divider and the entrance to the outlet conduit.

7. The fuel cell system of claim 1 wherein the entrance to the outlet conduit is spaced apart from the first end.

8. The fuel cell system of claim 1 wherein the inlet conduit is positioned between the first end and a region of the side wall adjacent to the entrance of the outlet conduit such that incoming fluid enters the channel of the chamber.

9. The fuel cell system of claim 1 wherein the outlet conduit is connected generally perpendicularly to the first end.

10. The fuel cell system of claim 1 wherein a longitudinal axis of the inlet conduit is generally perpendicular to a longitudinal axis of the outlet conduit.

11. The fuel cell system of claim 1 wherein the first end is generally planar and wherein the second end is concave.

12. The fuel cell system of claim 1 wherein a ratio of a diameter of the inlet conduit to a diameter of the separation chamber is within the range of 1:2 to 1:8; and
    wherein a ratio of a diameter of the outlet conduit to the diameter of the separation chamber is within the range of 1:2 to 1:8.

13. The fuel cell system of claim 1 wherein the divider and the outlet conduit are sole structures supported within the separation chamber.

14. The fuel cell system of claim 1 wherein the divider is formed from a material having a contact angle of less than ninety degrees.

15. The fuel cell system of claim 1 wherein an inner surface of the inlet conduit is tangentially connected to the inner surface of the side wall to provide a smooth tangential fluid entry for fluid flowing from the inlet conduit into the chamber and along the side wall.

16. The fuel cell system of claim 1 wherein the inlet conduit and outlet conduit have equal diameters.

17. The fuel cell system of claim 1 wherein the chamber is unobstructed between the inlet conduit and the entrance of the outlet conduit.

* * * * *